(12) United States Patent
Sato et al.

(10) Patent No.: US 10,843,954 B2
(45) Date of Patent: Nov. 24, 2020

(54) SYNTHETIC OPAQUE QUARTZ GLASS AND METHOD FOR PRODUCING THE SAME

(75) Inventors: Tatsuhiro Sato, Fukushima (JP);
Nobumasa Yoshida, Fukushima (JP);
Katsuhide Orikasa, Fukushima (JP);
Makoto Tanaka, Fukushima (JP)

(73) Assignee: SHIN-ETSU QUARTZ PRODUCTS CO., LTD., Tokyo (JP)

( * ) Notice: Subject to any disclaimer, the term of this patent is extended or adjusted under 35 U.S.C. 154(b) by 1234 days.

(21) Appl. No.: 12/515,727

(22) PCT Filed: Dec. 4, 2007

(86) PCT No.: PCT/JP2007/073387
§ 371 (c)(1),
(2), (4) Date: May 20, 2009

(87) PCT Pub. No.: WO2008/069194
PCT Pub. Date: Jun. 12, 2008

(65) Prior Publication Data
US 2010/0316858 A1    Dec. 16, 2010

(30) Foreign Application Priority Data
Dec. 5, 2006    (JP) ................................ 2006-328058

(51) Int. Cl.
*C03B 20/00*    (2006.01)
*C03B 19/06*    (2006.01)

(52) U.S. Cl.
CPC ............ *C03B 19/066* (2013.01); *C03B 19/06* (2013.01); *C03B 20/00* (2013.01); *C03B 2201/07* (2013.01); *C03C 2201/80* (2013.01)

(58) Field of Classification Search
USPC ...................... 65/17.4, 22, 29.15, 29.19, 32.1
See application file for complete search history.

(56) References Cited

U.S. PATENT DOCUMENTS 2,962,790 A * 12/1960 Daniel .................... B28B 21/08
264/138
3,619,440 A * 11/1971 Gray ............................ 264/628
(Continued)

FOREIGN PATENT DOCUMENTS

JP    61-040827 A    2/1986
JP    08143329    6/1996
(Continued)

OTHER PUBLICATIONS

Notification of Transmittal of Translation of the International Preliminary Report on Patentability, dated Jun. 18, 2009, PCT/JP2007/073387, 7 pp.

*Primary Examiner* — John M Hoffmann
(74) *Attorney, Agent, or Firm* — Cheng Law Group, PLLC

(57) ABSTRACT

Provided is a method for producing a synthetic opaque quartz glass where flame processing can be performed in high purity with a simple way and even a large sized one can be produced, and the synthetic opaque quartz glass. A method for producing a synthetic opaque quartz glass which comprises the step of heating and burning a quartz glass porous body under a pressure of from 0.15 MPa to 1000 MPa at a temperature of from 1200 ° C. The quartz glass porous body is prepared by depositing quartz glass particles which are produced by hydrolyzing a silicon compound with an oxyhydrogen flame.

2 Claims, 1 Drawing Sheet

100 μm

(56) References Cited

U.S. PATENT DOCUMENTS

| | | | |
|---|---|---|---|
| 3,806,570 A * | 4/1974 | Flamenbaum | C03B 19/1415 264/1.21 |
| 4,038,370 A * | 7/1977 | Tokimoto et al. | 423/336 |
| 4,222,760 A * | 9/1980 | Chyung et al. | 65/32.3 |
| 4,978,378 A * | 12/1990 | Ito et al. | 65/424 |
| 5,356,449 A * | 10/1994 | Kuwahara et al. | 65/421 |
| 5,585,173 A * | 12/1996 | Kamo et al. | 428/304.4 |
| 5,713,979 A * | 2/1998 | Nicholson et al. | 65/424 |
| 5,945,802 A * | 8/1999 | Konrad et al. | 318/807 |
| 5,972,488 A * | 10/1999 | Nagata et al. | 428/304.4 |
| 6,280,522 B1 * | 8/2001 | Watanabe et al. | 117/29 |
| 6,355,587 B1 * | 3/2002 | Loxley et al. | 501/54 |
| 6,380,110 B1 * | 4/2002 | Werdecker et al. | 501/54 |
| 6,381,986 B1 * | 5/2002 | Loxley et al. | 65/17.5 |
| 6,447,601 B1 * | 9/2002 | Phillips et al. | 117/13 |
| 2003/0121283 A1 | 7/2003 | Yu | |
| 2004/0018361 A1 * | 1/2004 | Takahashi et al. | 428/428 |

FOREIGN PATENT DOCUMENTS

| | | |
|---|---|---|
| JP | 09-012325 A | 1/1997 |
| JP | 09-020531 A | 1/1997 |
| JP | 10-203839 A | 8/1998 |

* cited by examiner

100 μm

100 μm

SYNTHETIC OPAQUE QUARTZ GLASS AND METHOD FOR PRODUCING THE SAME

TECHNICAL FIELD

The present invention relates to a synthetic opaque quartz glass and a method for producing the same.

BACKGROUND ART

As a method for producing an opaque quartz glass, Patent Document 1 discloses the method for producing an opaque quartz glass containing much fine bubbles which comprises: adding silicon nitride to powdery silica; molding them; and then heating the resultant at an oxygen-free atmosphere.

However, the method for producing an opaque quartz glass described in Patent Document 1 requires considerable labor for preparing raw materials. In addition, in the process of the production method, the maximum size of the resultant opaque quartz glass is limited, and further, contamination from the surface thereof is heavy when heating, so that it has been disadvantageous to apply the conventional opaque quartz glass to, for example, a quartz glass jig for a process of semiconductor production which needs high purity. Also, in the case of processing the conventional opaque quartz glass into various forms of quartz glass products where flame processing is essential and nitrogen may be added, the quartz glass products partially foam due to the added nitrogen and easily break, which leads problems therein.

Patent Document 1: JP 10-203839 A

DISCLOSURE OF THE INVENTION

Problems to be Solved by the Invention

It is an object of the present invention to provide a method of producing a synthetic opaque quartz glass where flame processing is capable at high purity with a simple way and also even the large sized synthetic opaque quartz glass is producible, and the synthetic opaque quartz glass.

Means for Solving the Problems

As a result of extensive researches by the inventors of the present invention in order to solve the above-mentioned problems, it was surprisingly found out that an opaque quartz glass can be obtained by heating and burning a quartz glass porous body neither under a vacuum or under an atmospheric pressure which was conventionally performed, but under a high pressure in which a pressure of 0.05 MPa or higher is applied to an atmospheric pressure. That is, the method for producing the synthetic opaque quartz glass according to the present invention comprises heating and burning a quartz glass porous body under a pressure of from 0.15 MPa to 1000 MPa at a temperature of from 1200° C. to 2000° C.

It is preferred that an atmosphere is an inert gas during heating and burning.

It is preferred that the quartz glass porous body is the one which is prepared by depositing quartz glass particles which are produced by hydrolyzing silicon compounds with an oxyhydrogen flame.

According to a first aspect of a synthetic opaque quartz glass of the present invention, the synthetic opaque quartz glass is produced by the above-described method of the present invention.

According to a second aspect of the synthetic opaque quartz glass of the present invention, the synthetic opaque quartz glass is composed of bubble layers and bubble-free layers provided alternately, wherein the density of the synthetic opaque quartz glass is 1.0 to 2.2 $g/cm^3$, the porosity thereof is 1 to 50%, an average diameter of isolated bubbles contained therein is 1 to 50 μm, the number of the isolated bubbles is $1\times10^6$ to $1\times10^9/cm^3$, and the each content of metal impurities of Li, Na, K, Mg, Ti, Fe, Cu, Ni, Cr and Al is 0.05 ppm or less, respectively.

In the second aspect of the synthetic opaque quartz glass of the present invention, the nitrogen content is preferably 50 ppm or less.

It is preferable that the bubble layers and the bubble-free layers are alternately laminated.

It is also preferable that the thickness of the bubble layer is of from 1 μm to 100 μm, and the thickness of the bubble-free layers is of from 1 μm to 200 μm.

The second aspect of the synthetic opaque quartz glass of the present invention can be produced by the above-mentioned method of the present invention.

EFFECT OF THE INVENTION

According to the method of the present invention, there can be obtained a synthetic opaque quartz glass to which flame processing is applicable at high purity with a simple way. According to the method of the present invention, even a large sized synthetic opaque quartz glass can also be obtained.

The synthetic opaque quartz glass of the present invention has uniform fine bubbles in the whole glass body and is excellent in shading effect. In addition, the synthetic quartz glass maintains its high purity and is excellent in flame processability. For the above reasons, the synthetic opaque quartz glass is applicable in various industrial fields and in particular it can be used in a semiconductor manufacturing field as a preferred member.

BEST MODE FOR CARRYING OUT THE INVENTION

Figure 1:
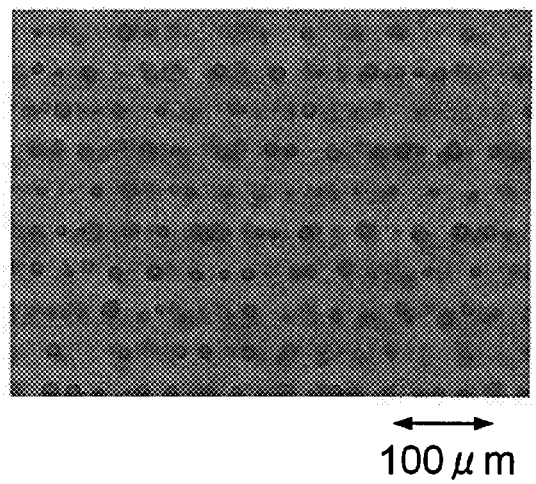
FIG. 1 is a photograph showing a result of Example 1.

Hereinafter, embodiments of the present invention will be described. It is needless to say that the embodiments are illustrative and can be modified in various ways without departing from the technical idea of the present invention.

The present invention will be described below in detail.

A synthetic opaque quartz glass can be obtained by heating and burning a quartz glass porous body under a pressure of from 0.15 MPa to 1000 MPa at a temperature of from 1200° C. to 2000° C. In the present invention, a quartz glass where permeability of light having a wavelength of 200 to 5000 nm is less than 5% at 1 mm thick is referred to as a synthetic quartz glass.

The quartz glass porous body is not particularly limited but is suitably a synthetic quartz glass porous body which is prepared by depositing quartz glass particles (soot) obtained by hydrolyzing raw material for forming glass with an oxyhydrogen flame. As glass forming raw material, a silicon compound is preferable, and as the silicon compound, for example, silicon tetrachloride, monosilane, trichlorosilane, dichlorosilane, and methyltrimethoxysilane can be used. Other compounds may be used such as a porous body prepared by a sol-gel method. It is preferable that the quartz glass porous body contains no nitrogen compound.

An atmosphere during heating and burning is not particularly limited, but includes, for example, reducing gases such as an inert gas and hydrogen, oxygen and chlorine, an inert gas being preferable, and nitrogen, Ar or the mixed gas thereof being more preferable.

A pressurizing range is between 0.15 and 1000 MPa, preferably between 0.3 and 1 MPa, and more preferably between 0.5 and 1.0 MPa. A pressure in pressurizing level between 1 and 1000 MPa requires an extremely strict safety measure on the device, resulting in a cost increase. The reason why the higher pressure is preferable is that, in correlation with the extent of the pressure, the number of fine bubbles contained in the quartz glass porous body is increased, the bubbles spread uniformly in the whole glass body, whereby opacity and uniformity thereof increase, and also uniformity in other various properties of the glass body as well as mechanical strength thereof increases.

As to the heating temperature, at lowest a temperature of 1200° C. or more is required to densify the glass body; however at a temperature of over 2000° C. the glass body is softened and the bubbles thereof are broken, resulting in being a transparent glass body. Therefore, the temperature range during heating and burning is between 1200° C. and 2000° C., preferably between 1300° C. and 1700° C. in the present invention. Time for heat treatment may be selected appropriately depending on conditions such as a pressure and a temperature, and in particular, it is preferable to keep it for 30 minutes to 10 hours, more preferably for 1 hour to 4 hours within the above-mentioned ranges of temperature and pressure.

A sintered body after the heating and burning step is completely densified so that a synthetic opaque quartz glass body can be obtained which has uniform fine bubbles in the whole glass body and is excellent in a shading effect by the method of the present invention.

In particular, the synthetic opaque quartz glass can be obtained by the method of the present invention wherein the density thereof is 1.0 g/cm$^3$ or more and 2.20 g/cm$^3$ or less, preferably over 2.1 g/cm$^3$ and 2.20 g/cm$^3$ or less, the porosity thereof is 1 to 50%, preferably 2 to 10%, an average diameter of isolated bubbles contained therein is 1 µm or more and 50 µm or less, preferably 1 µm or more and 30 µm or less, more preferably 1 µm or more and less than 10 µm, the number of the isolated bubbles is $1\times10^6$ to $1\times10^9$/cm$^3$, preferably $1\times10^7$ to $1\times10^9$/cm$^3$, more preferably over $6\times10^7$/cm$^3$ and $1\times10^9$/cm$^3$ or less.

The synthetic opaque quartz glass having high purity also can be obtained according to the method of the present invention wherein the contents of metal impurities of Li, Na, K, Mg, Ti, Fe, Cu, Ni, Cr and Al are 0.05 ppm or less (including 0 ppm), respectively.

In the present invention, a nitrogen concentration contained in the obtained synthetic opaque quartz glass is preferably 0 to 50 ppm, more preferably 0 to 10 ppm, further preferably 0 or more and less than 1 ppm. The nitrogen content of 50 ppm or less solves a problem such as clacking caused by flame processing treatment, whereby flame processing treatment can be performed easily.

In addition, in the method of the present invention, using a synthetic quartz glass porous body which is prepared by depositing quartz glass particles synthesized by hydrolyzing raw material for forming glass with an oxyhydrogen flame, there may be obtained the synthetic opaque quartz glass where bubble layers containing the number of $2\times10^6$ to $5\times10^9$/cm$^3$ of isolated bubbles and bubble-free layers containing the number of 0 to $1\times10^3$/cm$^3$ of isolated bubbles are alternately deposited. The above-described silicon compounds are preferably used as glass forming raw material.

The thickness of the bubble layer is preferably 1 to 100 µm, more preferably 1 to 50 µm. The thickness of the bubble-free layer is preferably 1 to 200 µm, more preferably 1 to 100 µm.

EXAMPLES

Hereinafter, the present invention will be described more specifically by way of examples. However, it should be appreciated that these examples are shown for illustrative purposes, and should not be interpreted in a limiting manner.

Example 1

Quartz glass particules formed by hydrolyzing silicon tetrachloride were deposited onto a rotating base body to produce a quartz glass porous body (length: 2000 mm, diameter: 400 mm). The quartz glass porous body was set into a heating furnace, which was vacuum-evacuated and thereafter pressurized to 0.6 MPa with filling nitrogen gas therein. Next, the furnace was heated to a temperature of 1500° C. in the next 2 hours and kept for 2 hours, followed by cooling spontaneously to a room temperature and then the quartz glass porous body was taken out therefrom after the pressure being reduced to an atmospheric pressure. The obtained quartz glass porous body was densified and the whole body was whitened.

As a result of measuring permeability of the obtained white opaque quartz glass, permeability of light with a wavelength of 200 to 5000 nm at a thickness of 1 mm was 0.5 to 2.0%.

A photograph of the obtained white opaque quartz glass was shown in FIG. 1. As shown in FIG. 1, in the obtained opaque quartz glass the bubble layers having the thickness of 10 µm and bubble-free layers having the thickness of 50 µm were deposited alternately.

The results of measuring the diameter and the content of the isolated bubbles contained in the obtained white opaque quartz glass were that the diameter of the isolated bubbles was ranging between 1 and 40 µm, the average diameter was 9 µm, the number of the isolated bubbles was $9\times10^7$/cm$^3$ and the bubble rate was 6.0%. The number of the isolated bubbles in the bubble layers was $1\times10^8$/cm$^3$ and the number of the isolated bubbles in the bubble-free layers was $1\times10^2$/cm$^3$.

In addition, the results of measuring the density, the porosity, the content of the metal impurities, the concentrations of the OH group and nitrogen of the obtained white opaque quartz glass were that the density was 2.16 g/cm$^3$, the porosity was 8%, the content of each metal impurities of Li, Na, K, Mg, Ti, Fe, Cu, Ni, Cr and Al was 0.005 ppm or less, the OH group concentration was 200 ppm and the nitrogen concentration was 0.5 ppm.

When flame processing treatment such as welding was applied to the obtained synthetic opaque quartz glass, the synthetic opaque quartz glass was easily processed with no problem at all as in the case of the conventional transparent quartz glass body.

Example 2

An experiment was conducted in the same way as in Example 1 except that the pressure during heat treatment to densify was 0.15 MPa and the same result as Example 1 was obtained.

Example 3

An experiment was conducted in the same way as in Example 1 except that the pressure during heat treatment to densify was 800 MPa and the same result as Example 1 was obtained.

Example 4

An experiment was conducted in the same way as in Example 1 except that the atmosphere during heat treatment to densify was Ar and the same result as Example 1 was obtained.

Example 5

An experiment was conducted in the same way as in Example 1 except that the temperature during heat treatment to densify was 1600° C. and the same result as Example 1 was obtained.

Example 6

An experiment was conducted in the same way as in Example 1 except that the condition during heat treatment to densify was changed to keeping a temperature of 1200° C. for 4 hours and the same result as Example 1 was obtained.

Example 7

An experiment was conducted in the same way as in Example 1 except that the condition during heat treatment to densify was changed to keeping a temperature of 1900° C. for 1 hour and the same result as Example 1 was obtained.

Comparative Example 1

Quartz glass particles formed by hydrolyzing silicon tetrachloride were deposited onto a rotating base body to produce a synthetic quartz glass porous body (length: 2000 mm, diameter: 400 mm). The quartz glass porous body was set into a heating furnace, which was vacuum-evacuated and thereafter pressurized to 0.01 MPa with filling nitrogen gas therein. Next, the furnace was heated to a temperature of 1500° C. in the next 2 hours and kept for 2 hours, followed by cooling spontaneously to a room temperature, and then the quartz glass porous body was taken out therefrom after the pressure being reduced to an atmospheric pressure. The obtained quartz glass porous body was densified but the whole body was transparentized.

The content of each metal impurities of Li, Na, K, Mg, Ti, Fe, Cu, Ni, Cr and Al was 0.005 ppm or less, and the OH group content in the glass body was 200 ppm.

Comparative Example 2

A starting material was used where silicon nitride powder was mixed and dispersed into amorphous silica powder having an average diameter of 10 μm in an amount of 0.01 parts by weight of per 100 parts by weight of the silica powder. The starting material was loaded into a casting mold which has an inside diameter of 500 mm and an inside height of 300 mm and the casting mold was set into a heating furnace to heat it under an oxygen-free atmosphere at a temperature of 1800° C. in an atmospheric pressure for 30 minutes to form bubbles by vitrifying and foaming, whereby an opaque quartz glass was obtained.

Figure 2:
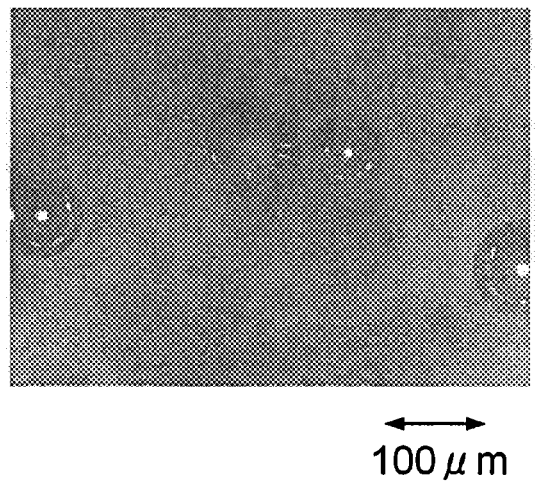
FIG. 2 is a photograph showing a result of Comparative Example 2.

A photograph of the obtained opaque quartz glass was shown in FIG. 2. The results of measuring the density of the obtained opaque quartz glass, the porosity, the average diameter and the content of the isolated bubbles contained therein were that the density was 2.0 g/cm$^3$, the porosity was 14%, the average diameter of the isolated bubbles contained therein was 60 μm, and the number of the isolated bubbles was $2 \times 10^6$/cm$^3$.

In the obtained white opaque quartz glass, the content of each the metal impurities of Li, Na, K, Mg, Ti, Fe, Cu, Ni, Cr and Al was identified in a range of 0.1 to 0.3 ppm due to diffusion of the metal impurities from the casting mold. The nitrogen content thereof was 300 ppm.

When flame processing treatment such as welding was applied to the obtained synthetic opaque quartz glass, a large amount of bubbles were generated in the interface and strength thereof was significantly declined.

The invention claimed is:

1. A method for producing a synthetic opaque quartz glass, consisting essentially of:
   hydrolyzing a silicon compound with an oxyhydrogen flame to form quartz glass soot,
   depositing the quartz glass soot onto a rotating base body to produce a quartz glass porous body;
   setting the quartz glass porous body in a furnace;
   pressurizing an atmosphere of the furnace containing the quartz glass porous body to a pressure within a range of 0.15 MPa to 1000 MPa, the atmosphere of the furnace containing an inert gas;
   heating the furnace containing the quartz glass porous body to a temperature within a range of 1200° C. to 2000° C.: and maintaining said pressure and said temperature for 30 minutes to 10 hours,
   thereby burning the quartz glass porous body into the synthetic opaque quartz glass having a nitrogen concentration that is in a range of 0 to 10 ppm,
   wherein the synthetic opaque quartz glass comprises bubbles spread uniformly throughout an entirety of the synthetic opaque quartz glass, and wherein an average diameter of the bubbles is 1 to 50 μm.

2. The method of claim 1, wherein the silicon compound includes silicon tetrachloride.

* * * * *